US011520910B2

(12) United States Patent
Danielson et al.

(10) Patent No.: US 11,520,910 B2
(45) Date of Patent: Dec. 6, 2022

(54) SYSTEM AND METHOD FOR ROUTING DATA TO AUTHORIZED USERS BASED ON SECURITY CLASSIFICATION OF DATA

(71) Applicant: Bank of America Corporation, Charlotte, NC (US)

(72) Inventors: Christopher Lee Danielson, Poway, CA (US); Marcus Raphael Matos, Richardson, TX (US); Daniel Joseph Serna, The Colony, TX (US); Patrick Nicholas Lawrence, Pensacola, FL (US)

(73) Assignee: Bank of America Corporation, Charlotte, NC (US)

( * ) Notice: Subject to any disclaimer, the term of this patent is extended or adjusted under 35 U.S.C. 154(b) by 62 days.

(21) Appl. No.: 17/170,963

(22) Filed: Feb. 9, 2021

(65) Prior Publication Data

US 2022/0253539 A1    Aug. 11, 2022

(51) Int. Cl.
*G06F 21/60* (2013.01)
*G06F 21/62* (2013.01)
*G06F 21/31* (2013.01)

(52) U.S. Cl.
CPC ............ *G06F 21/604* (2013.01); *G06F 21/31* (2013.01); *G06F 21/6227* (2013.01); *G06F 21/6245* (2013.01); *G06F 2221/2141* (2013.01)

(58) Field of Classification Search
CPC .... G06F 21/604; G06F 21/31; G06F 21/6227; G06F 21/6245; G06F 2221/2141
USPC ......................................................... 726/26
See application file for complete search history.

(56) References Cited

U.S. PATENT DOCUMENTS

| 7,593,942 | B2 | 9/2009 | Sack et al. |
| 7,725,501 | B1 | 5/2010 | Stillman et al. |
| 7,814,075 | B2 | 10/2010 | Sack et al. |
| 7,814,076 | B2 | 10/2010 | Sack et al. |
| 7,822,024 | B2 | 10/2010 | Wybenga et al. |
| 7,822,653 | B2 | 10/2010 | Hahn-Carlson et al. |
| 7,831,570 | B2 | 11/2010 | Sack et al. |
| 7,890,530 | B2 | 2/2011 | Bilger et al. |
| 7,921,284 | B1 | 4/2011 | Kinghorn et al. |
| 8,032,084 | B2 | 10/2011 | Demirbasa et al. |
| 8,060,744 | B2 | 11/2011 | O'Brien et al. |

(Continued)

FOREIGN PATENT DOCUMENTS

WO    WO-2008076183 A2 *   6/2008   ....... G06F 17/30017

*Primary Examiner* — Bryan F Wright

(57) ABSTRACT

A system for classifying a data item to communicate to authorized users extracts features from the data item, where the features comprise a responsibility feature and a sensitivity feature. The responsibility feature indicates a job responsibility associated with the data item. The sensitivity feature indicates a sensitivity level of the data item. The system determines, based on the responsibility feature, that the data item belongs to a particular responsibility class. The system determines, based on the sensitivity feature, that the data item belongs to a particular sensitivity class. The system determines whether a user to whom the data item is directed belongs to the particular responsibility class and sensitivity class to which the data item belongs. The system sends the data item to the user, if is it determined that the user belongs to the particular responsibility class and sensitivity class to which the data item belongs.

20 Claims, 2 Drawing Sheets

(56) References Cited

U.S. PATENT DOCUMENTS

| | | |
|---|---|---|
| 8,117,464 B1 | 2/2012 | Kogelnik |
| 8,126,785 B2 | 2/2012 | Hahn-Carlson et al. |
| 8,176,563 B2 | 5/2012 | Redlich et al. |
| 8,224,248 B2 | 7/2012 | Demirbasa et al. |
| 8,396,838 B2 | 3/2013 | Brockway et al. |
| 8,495,746 B2 | 7/2013 | Fissel et al. |
| 8,565,436 B2 | 10/2013 | Mansour et al. |
| 8,577,833 B2 | 11/2013 | Erla et al. |
| 8,595,269 B2 | 11/2013 | Farcasiu et al. |
| 8,713,688 B2 | 4/2014 | Wahl et al. |
| 9,014,026 B2 | 4/2015 | Raleigh |
| 9,015,301 B2 | 4/2015 | Redlich et al. |
| 9,043,874 B2 | 5/2015 | Riley |
| 9,049,195 B2 | 6/2015 | Sack et al. |
| 9,311,499 B2 | 4/2016 | Redlich et al. |
| 9,323,948 B2 | 4/2016 | Gupta et al. |
| 9,349,016 B1 | 5/2016 | Brisebois et al. |
| 9,501,744 B1 | 11/2016 | Brisebois et al. |
| 9,734,169 B2 | 8/2017 | Redlich et al. |
| 9,779,260 B1 | 10/2017 | Brisebois et al. |
| 10,089,489 B2 | 10/2018 | Goldfarb et al. |
| 10,114,766 B2 | 10/2018 | Takahashi |
| 10,169,603 B2 | 1/2019 | Becker et al. |
| 10,248,657 B2 | 4/2019 | Prahlad et al. |
| 10,255,338 B2 | 4/2019 | Romano et al. |
| 10,268,839 B1 | 4/2019 | Kenthapadi et al. |
| 10,484,409 B2 | 11/2019 | Ogawa |
| 10,498,745 B2 | 12/2019 | Bacastow et al. |
| 10,498,772 B2 | 12/2019 | Adhar |
| 10,812,531 B2 | 10/2020 | Narayanaswamy et al. |
| 2004/0186809 A1 | 9/2004 | Schlesinger et al. |
| 2007/0011026 A1* | 1/2007 | Higgins ............... G06Q 30/02 715/741 |
| 2007/0101297 A1* | 5/2007 | Forstall ............... G06F 3/0482 715/835 |
| 2008/0034314 A1* | 2/2008 | Louch ............... G06F 3/0481 715/764 |
| 2008/0072035 A1 | 3/2008 | Johnson et al. |
| 2009/0319772 A1 | 12/2009 | Singh et al. |
| 2010/0250497 A1 | 9/2010 | Redlich et al. |
| 2012/0209884 A1* | 8/2012 | Mattsson ............ G06F 21/6227 707/783 |
| 2012/0245745 A1* | 9/2012 | Vandevelde ............ H02S 50/00 700/286 |
| 2014/0075567 A1 | 3/2014 | Raleigh et al. |
| 2015/0199405 A1* | 7/2015 | Redlich ............... H04L 63/20 707/770 |
| 2015/0347773 A1 | 12/2015 | Bonney et al. |
| 2016/0248809 A1 | 8/2016 | Smith et al. |
| 2017/0208204 A1* | 7/2017 | Kim ............... H04N 1/0097 |
| 2018/0330107 A1 | 11/2018 | Gordon et al. |
| 2020/0151353 A1 | 5/2020 | Struttmann |

* cited by examiner

SYSTEM AND METHOD FOR ROUTING DATA TO AUTHORIZED USERS BASED ON SECURITY CLASSIFICATION OF DATA

TECHNICAL FIELD

The present disclosure relates generally to information security, and more specifically to a system and method for routing data to authorized users based on security classification of data.

BACKGROUND

Using current data communication and information security technologies, data may be over-shared or under-shared among employees, databases, servers, and other entities within an organization. For example, an employee may receive data that may be irrelevant to the job responsibility of the employee. In another example, an employee may receive data that the employee is not authorized to access. The current data communication and information security technologies may not be configured to provide a reliable solution for routing data to authorized users.

SUMMARY

Current information security technologies may not be configured to provide a reliable solution for routing data to authorized users. This disclosure contemplates systems and methods for routing data to authorized users based on the security classification of data. To this end, the disclosed system performs responsibility classification and sensitivity classification on each data item as described below.

In the responsibility classification process, the disclosed system classifies the data item based on its responsibility feature, where the responsibility feature of the data item indicates a job responsibility associated with the data item. The disclosed system may use a Natural Language Processing (NLP) algorithm to extract the responsibility features of the data item. For example, the responsibility feature of the data item may indicate that the data item is directed to users or employees with project development positions within the organization. In this example, the disclosed system classifies the data item into the project development responsibility class. For example, the data items may comprise email messages, application notification messages, Application Programming Interface (API) requests, data stored in databases, data stored in servers, data queues, and/or any data that is communicated within an organization.

In the sensitivity classification process, the disclosed system classifies the data item based on its sensitivity features, where the sensitivity feature of the data item indicates a sensitivity level or security level associated with the data item. Similar to that described above, the disclosed system may use an NLP algorithm to extract the sensitivity feature of the data item. For example, the sensitivity feature of the data item may indicate that the data item has a security level of 8 out of 10. In this example, the disclosed system classifies the data item into the 8 out of 10 security class. As such, the disclosed system separately classifies the data item in terms of its responsibility feature and sensitivity feature.

The disclosed system determines a responsibility level and security level of a user to whom the data item is directed. The responsibility level of the user indicates a job responsibility of the user, such as a development manager, a mid-level information security employee, etc. The security level of the user indicates corresponding data items that the user is authorized to access. For example, the security level of the user may indicate that the user has a security level of 6 out of 10, etc. The disclosed system determines whether the responsibility level and the security level of the user, respectively, belong to the same responsibility class and the sensitivity class that the data item belongs to, as determined above during the responsibility classification and sensitivity classification processes. If it is determined that the responsibility level and the security level of the user, respectively, belong to the same responsibility class and the sensitivity class that the data item belongs to, the disclosed system routes the data item to the user.

Otherwise, in one example, the disclosed system may terminate the communication of the data item to the user. In another example, the disclosed system may identify one or more portions in the data item that the user is not authorized to access, and obfuscate the one or more portions, such that the one or more portions are not visible. For example, assume that the data item comprises a piece of code that the disclosed system has determined to be associated with a sensitivity level of 9 out of 10. Also, assume that the user has a security level of 6 out of 10. As such, in this example, the disclosed system may modify the data item by obfuscating the piece of code. The disclosed system may then route the modified data item to the user.

In one embodiment, the disclosed system may receive the data item from its source or sender, such as servers, computing devices, software/web/mobile applications, etc. used for data communication in the organization. In another embodiment, the disclosed system may extract the data item from its source, such as a database. In another embodiment, the disclosed system may intercept the data item as the data item is on a communication path to one or more users.

In one embodiment, a system for classifying a plurality of data items to communicate to authorized users comprises a memory and a processor. The memory is operable to store a plurality of user profiles, where each user profile from the plurality of user profiles comprises at least one of a responsibility level and a security level associated with a user. The responsibility level indicates a job responsibility associated with the user. The security level indicates corresponding data items that the user is authorized to access.

The processor is operably coupled with the memory. The processor is configured to receive the plurality of data items, where each data item from the plurality of data items is on a communication path to reach a user. The processor performs operations described below for each data item from the plurality of data items. The processor extracts features from the data item, where the extracted features comprise at least one of a responsibility feature and a sensitivity feature associated with the data item. The responsibility feature indicates a job responsibility associated with the data item. The sensitivity feature indicates a sensitivity level associated with the data item. The processor determines, based at least in part upon the responsibility feature, that the data item belongs to a particular responsibility class. The processor determines, based at least in part upon the sensitivity feature, that the data item belongs to a particular sensitivity class. The processor determines a responsibility level and a security level associated with a user to whom the data item is directed. The processor determines whether the responsibility level associated with the user belongs to the particular responsibility class. The processor determines whether the security level associated with the user belongs to the particular sensitivity class. In response to determining that the responsibility level associated with the user belongs to the particular responsibility class and the security level associated with the user belongs to the particular sensitivity class, the processor communicates the data item to the user.

The disclosed systems provide several practical applications and technical advantages which include: 1) technology that intercepts a data item from a communication path to its corresponding user in order to verify whether the user is authorized to access the data item and the data item is relevant to the job responsibility of the user; 2) technology that performs a responsibility classification on the data item to determine a responsibility class to which the data item belongs, by extracting a responsibility feature from the data item; 3) technology that performs a sensitivity classification on the data item to determine a sensitivity class to which the data item belongs, by extracting a sensitivity feature from the data item; 4) technology that routes the data item to the user, if it is determined that a responsibility level and a security level of the user, respectively, belong to the same responsibility class and the sensitivity class; and 5) technology that modifies the data item by obfuscating one or more portions of the data item, that are determined to have sensitivity levels higher than the security level of the user, i.e., obfuscating one or more portions that the user is not authorized to access.

As such, the systems described in this disclosure may improve the information security technologies by classifying data items based on their responsibility and sensitivity features or levels. The systems described in this disclosure may further improve data communications within an organization by reducing over-sharing and under-sharing data. For example, the disclosed system may communicate data items to users whose responsibility levels and security levels, respectively, belong to the same responsibility class and sensitivity class that those data items belong to. As such, irrelevant data items (such as, data items that belong to responsibility classes not associated with the responsibility level of the user) and data items that belong to higher (and/or lower) sensitivity level classes compared to the security level of the user may be filtered.

This, in turn, provides an additional practical application of improving underlying operations of systems (e.g., computing devices, databases, etc.) in the organization since these systems may not have to spend as much processing and time resources for communicating, routing, and processing data items that would otherwise be spent using the current data communication and information security technologies. Furthermore, by reducing the over-sharing and under-sharing data, memory recourses of the systems in the organization may be utilized more efficiently. Thus, the disclosed system may be integrated into a practical application of improving the data communications and underlying operations of entities used in the organization.

The disclosed system may further be integrated into an additional practical application of securing data items that belong to higher sensitivity classes from being exposed to users who do not have security levels to access those data items. The disclosed system may also or alternatively reduce or eliminate practical and technical barriers for data classifications by providing methods for classifying data items based on responsibility and sensitivity features.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
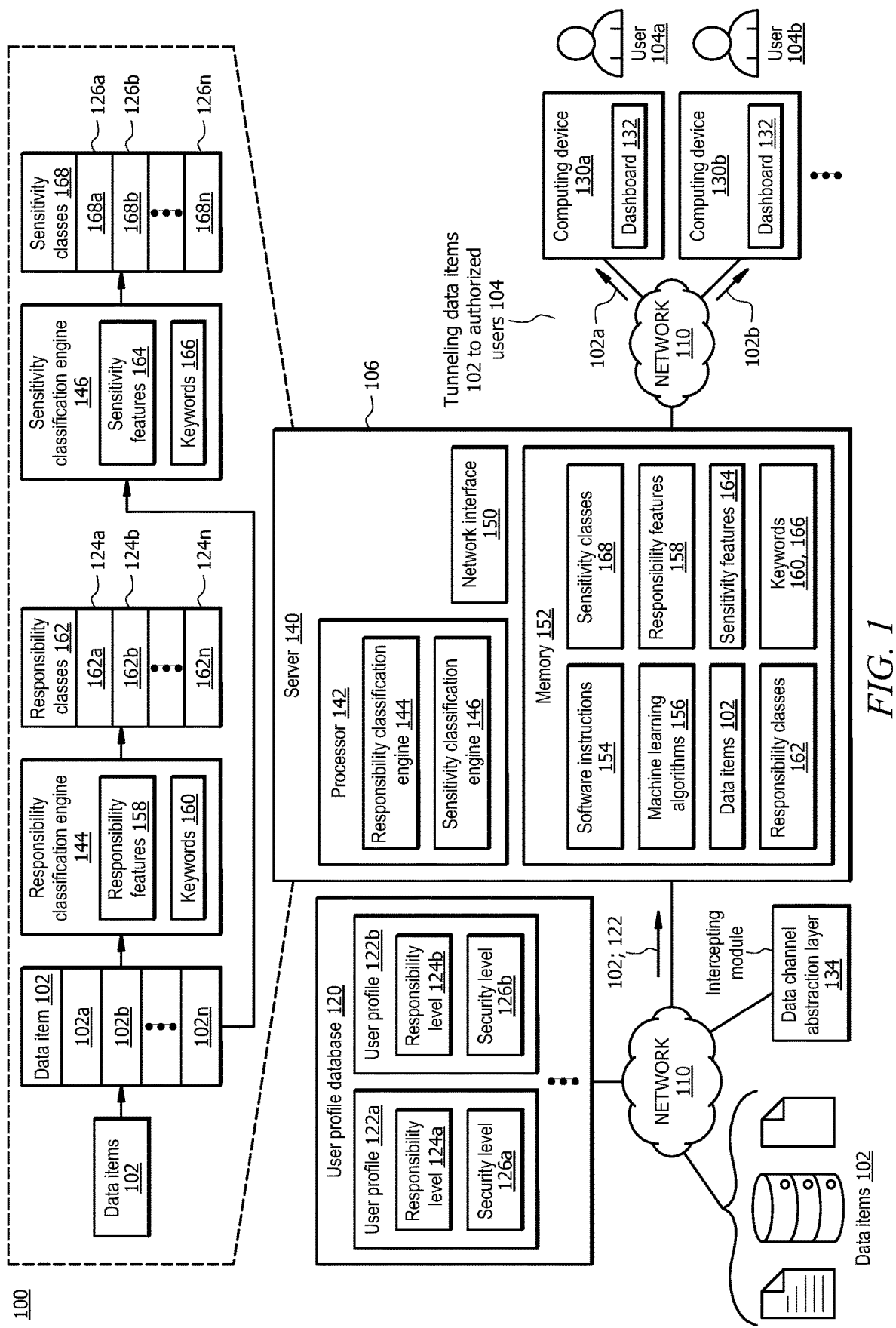
FIG. 1 illustrates an embodiment of a system configured to classify a plurality of data items to communicate to authorized users.

FIG. 1 illustrates one embodiment of a system 100 that is configured to classify data items 102 in order to route each data item 102 to authorized users 104 based on responsibility features 158 and sensitivity features 164 extracted from each data item 102. In one embodiment, system 100 comprises a user profile database 120 and server 140. In some embodiments, system 100 may further comprise a data channel abstraction layer 134, computing devices 130 (each associated with a user 104), and a network 110. Network 110 enables communications between components of the system 100. The server 140 comprises a processor 142 in signal communication with a memory 152. Memory 152 comprises software instructions 154 that when executed by the processor 142 cause the processor 142 to perform one or more functions described herein. For example, when the software instructions 154 are executed, the processor 142 executes a responsibility classification engine 144 to classify each data item 102 based on its responsibility features 158, and a sensitivity classification engine 146 to classify each data item 102 based on its sensitivity features 164. The user profile database 120 stores user profiles 122 that provide information that may be used by the software instructions 154 and/or the processor 142. In other embodiments, system 100 may not have all of the components listed and/or may have other elements instead of, or in addition to, those listed above.

In general, system 100 receives a plurality of data items 102 for processing, where each data item 102 is on a communication path to reach a user 104. For example, the plurality of data items 104 may comprise email messages, application notification messages, Application Programming Interface (API) requests, data stored in databases, data stored in servers, data queues, and/or any data that is communicated within an organization 106. The system 100 performs one or more operations described below on each data item 102 from the plurality of data items 102. The system 100 (via the responsibility classification engine 144) extracts responsibility features 158 from the data item 102, where the responsibility features 158 indicate a job responsibility associated with the data item 102. Based on the extracted responsibility features 158, the responsibility classification engine 144 determines a corresponding responsibility class 162 to which the data item 102 belongs. In other words, the responsibility classification engine 144 categorically maps the data item 102 based on its corresponding responsibility features 158. The system 100 (via the sensitivity classification engine 146) extracts sensitivity features 164 from the data item 102, where the sensitivity features 164 indicate a sensitivity level associated with the data item 102. Based on the extracted sensitivity features 164, the sensitivity classification engine 146 determines a corresponding sensitivity class 168 to which the data item 102 belongs. In other words, the sensitivity classification engine 146 categorically maps the data item 102 based on its corresponding sensitivity features 164. The system 100 determines whether a user 104 that the data item 102 is directed to is authorized to view the data item 102. In this operation, the system 100 determines a responsibility level 124 and security level 126 associated with the user 104. For example, the system 100 determines the responsibility levels 124 and security levels 126 by processing the user profiles 122 stored in the user profile database 120. The system 100 determines whether the responsibility level 124 and security level 126 associated with the user 104, respectively, belongs to the same responsibility class 162 and sensitivity class 168 that the data item 102 belongs to. If the system 100 determines that the responsibility level 124 and security level 126 associated with the user 104, respectively, belongs to the same responsibility class 162 and sensitivity class 168 that the data item 102 belongs to, the system 100 communicates the data item 102 to the user 104. In other words, if the system 100 determines that the user 104 is authorized to access the data item 102 and the data item 102 is relevant to the user 104, the system 100 communicates the data item 102 to the user 104. Otherwise, the system 100 may terminate the communication path of the data item 102 to the user 104.

System Components

Data items 102 generally comprise any data that is communicated within an organization 106. For example, data items may comprise email messages, application notification messages, API requests, API calls, data stored in databases, data queues, etc. In one example, a data item 102 may be associated with an internal entity with respect to the organization 106, such as a data item 102 communicated between users 104 (or the employees of the organization 106). In another example, a data item 102 may be associated with an external entity, such as a client of the organization 106, another organization, etc. Application notification messages may be associated with any software/web/mobile application used within the organization 106. In particular examples, application notification messages may be associated with a project development application, a budgeting application, and/or the like. Data queues may be associated with any message communication system that facilitates communicating data items 102 to its subscribers, e.g., computing devices 130, etc. In a particular example, the data queues may be associated with Kafka, RabbitMQ, and the like.

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

User profile database 120 generally comprises any storage architecture. Examples of the user profile database 120, include, but are not limited to, a network-attached storage cloud, a storage area network, a storage assembly directly (or indirectly) coupled to one or more components of the system 100. The user profile database 120 stores user profiles 122, where each user profile 122 is associated with a user 104 (or an employee of the organization 106). In the illustrated example of FIG. 1, the user profile database 120 stores a first user profile 122a and a second user profile 122b. The first user profile 122a is associated with a first user 104a. The second user profile 122b is associated with a second user 104b. The first user profile 122a comprises a first responsibility level 124a and a first security level 126a. The first responsibility level 124a indicates a job responsibility or a position of the first user 104a in the organization 106. For example, the first responsibility level 124a may indicate that the first user 104a is a development manager, a security information manager, an ordinary employee in a development department, and/or any position within the organization 106. The first security level 126a indicates corresponding data items 102 that the first user 104a is authorized to access. In a particular example, the first security level 126a may be represented by a numerical value from one to ten, where if the first security level 126a is represented by a high numerical value (e.g, 9 out of 10), it is an indication that the first user 104a is authorized to access particular sensitive or confidential information related to their job responsibility. The second user profile 122b comprises a second responsibility level 124b and a second security level 126b. Similar to that described above with respect to the first user profile 122a, the second responsibility level 124b indicates a job responsibility of the second user 104b, and the second security level 126b indicates corresponding data items 102 that the second user 104b is authorized to access. The user profile database 120 may store other user profiles 122 in addition to the first user profile 122a and the second user profile 122b.

Each of the computing devices 130a and 130b is generally any device that is configured to process data and interact with users 102. Examples of computing devices 130a and 130b include, but are not limited to, a personal computer, a desktop computer, a workstation, a server, a laptop, a tablet computer, a mobile phone (such as smartphones), etc. The first computing device 130a may be associated with the first user 104a. The second computing device 130b may be associated with the second user 104b. The users 104 may use the computing devices 130 to view or access data items 102. For example, the users 104 may access the data items 102 from a dashboard 132.

Dashboard 132 may generally comprise any user interface that can be used to display data items 102 to the users 104. The dashboard 132 may be operably coupled with the responsibility classification engine 144 and sensitivity classification engine 146. For example, in the case of the first user 104a, once the responsibility classification engine 144 and sensitivity classification engine 146 determine the first user 104a is authorized to access the first data item 102a, the server 140 communicates the first data item 102a to the first user 104a (at the first computing device 130a), such that the first data item 102a is displayed on the dashboard 132 on the first computing device 130a. The dashboard 132 may comprise user interfaces, such as buttons to select or activate a responsibility class 162 and a sensitivity class 168 to display data items 102 that belong to the selected responsibility class 162 and a sensitivity class 168. The buttons for selecting responsibility class 162 and sensitivity class 168 can be activated or configured for each user 102 based on their responsibility level 124 and security level 126, respectively. For example, in the case of the first user 104a, the dashboard 132 on the first computing device 130a can be configured to display particular data items 102 that belong to the same responsibility class 162 and sensitivity class 168 as the first user 104a, i.e., display particular data items 102 that are relevant to the first user 104a and that the first user 104a is authorized to access. In one example, the first user 104a may select the configuration of the dashboard 132. In another example, the processor 142 may select the configuration of a dashboard 132 for the first user 104a.

Data Channel Abstraction Layer

Data channel abstraction layer 134 may generally comprise any software and/or hardware module, such as one or more servers, to receive the data items 102 and forward the data items 102 to the server 140 for processing. In a particular example, the data channel abstraction layer 134 may include a message communication system that senders or sources of data items 102 can subscribe to as publishers of the data items 102. Likewise, receivers of the data items 102 (e.g., computing devices 130, server 140, etc.) can subscribe to as receivers of the data items 102. As such, each data item 102 may be appended or added with a subscription component indicating that the data item 102 should be routed to the data channel abstraction layer 134. Upon receipt of the data items 102, the data channel abstraction layer 134 forwards the data items 102 to the server 140 to determine whether a user 104 that each data item 102 is directed to is authorized to access the data item 102. In another example, the data channel abstraction layer 134 (or the server 140) may extract or fetch the data items 102 from their sources, such as databases.

In one embodiment, the data channel abstraction layer 134 may act as an intercepting module that intercepts data items 102 from their communication paths to their corresponding destinations, e.g., computing devices 130. For example, as a data item 102 is on its way to a computing device 130, the data channel abstraction layer 134 intercepts the data item 102 and forwards the data item 102 to the server 140 for processing. In one embodiment, the interception of the data items 102 may be performed by the server 140.

Server

Server 140 is generally a server or any other device configured to process data and communicate with computing devices (e.g., computing devices 130), databases (e.g., user profile database 120), and a data channel abstraction layer 134 via the network 110. In one example, server 140 may be a backend server 140 associated with the organization 106. The server 140 is generally configured to oversee operations of the processor 142 as described further below.

Processor 142 comprises one or more processors operably coupled to the memory 152. The processor 142 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 154) to implement the responsibility classification engine 144 and sensitivity classification engine 146. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1 and 2. For example, the processor 142 may be configured to perform one or more steps of method 200 as described in FIG. 2.

Network interface 150 is configured to enable wired and/or wireless communications (e.g., via network 110). The network interface 150 is configured to communicate data between the server 140 and other devices (e.g., computing devices 130), databases (e.g., user profile database 120), systems (e.g., data channel abstraction layer 134), or domains. For example, the network interface 150 may comprise a WIFI interface, a local area network (LAN) interface, a wide area network (WAN) interface, a modem, a switch, or a router. The processor 142 is configured to send and receive data using the network interface 150. The network interface 150 may be configured to use any suitable type of communication protocol as would be appreciated by one of ordinary skill in the art.

Memory 152 may be volatile or non-volatile and may comprise a read-only memory (ROM), random-access memory (RAM), ternary content-addressable memory (TCAM), dynamic random-access memory (DRAM), and static random-access memory (SRAM). Memory 152 may be implemented using one or more disks, tape drives, solid-state drives, and/or the like. Memory 152 is operable to store the data items 102, software instructions 154, machine learning algorithms 156, responsibility features 158, keywords 160, 166, responsibility classes 168 (i.e., the results of the responsibility classification process by the responsibility classification engine 144), sensitivity features 164, sensitivity classes 168 (i.e., the results of the sensitivity classification process by the sensitivity classification engine 146), and/or any other data or instructions. The software instructions 154 may comprise any suitable set of instructions, logic, rules, or code operable to execute the processor 142.

Responsibility Classification Engine and its Operations

Responsibility classification engine 144 may be implemented by the processor 142 executing software instructions 154, and is generally configured to classify the data items 102 based on responsibility features 158 extracted from the data items 102. The responsibility classification engine 144 may classify or cluster the data items 102 into any of responsibility classes 162a, 162b, . . . , 162n, etc.

In one embodiment, the responsibility classification engine 144 may be implemented using machine learning classification algorithms, such as, for example, Support Vector Machine (SVM), Naive Bayes, Logistic Regression, k-Nearest Neighbors, Decision Trees, etc. In other embodiment, responsibility classification engine 144 may utilize a neural network comprising neural network layers, whose weight and bias values are optimized during training, testing, and refining processes. As such, the responsibility classification engine 144 may implement supervised and/or unsupervised machine learning approaches. The responsibility classification engine 144 may perform one or more operations described below for each data item 102 to determine a corresponding responsibility class 162 that each data item 102 belongs to.

The responsibility classification engine 144 may use a Natural Language Processing (NLP) algorithm to extract features from a data item 102. In this operation, the responsibility classification engine 144 may use any type of text analysis, such as word segmentation, sentence segmentation, word tokenization, sentence tokenization, and/or the like.

The extracted features of the data item 102 may comprise responsibility features 158 associated with the data item 102, where the responsibility features 158 indicate a job responsibility associated with the data item 102. The extracted features of the data item 102 may further comprise an indication of a recipient of the data item 102, the contextual data of the data item 102, among other features.

To extract the responsibility features 158 from the data item 102, the responsibility classification engine 144 may be trained to search for one or more keyword 160 from a first set of particular keywords 160 in the data item 102, where the first set of particular keywords 160 may indicate a job responsibility associated with the data item 102. For example, the first set of particular keywords 160 may comprise titles or positions of the users 104 in the organization 106. Once the responsibility classification engine 144 extracts the responsibility features 158 from the data item 102, the responsibility classification engine 144 determines a corresponding responsibility class 162 to which the data item 102 belongs.

In one embodiment, the responsibility classification engine 144 may be trained to divide or generate the responsibility classes 162 in terms of the responsibility levels 124. As such, the responsibility classes 162 may represent or be associated with the responsibility levels 124. For example, a first responsibility class 162a may represent a development manager (or development management) responsibility level 124a, and a second responsibility class 162b may represent a mid-level security employee responsibility level 124b. For example, if the responsibility classification engine 144 determines that a first data item 102a is associated with a first responsibility feature 158 that indicates the first data item 102a belongs to a development manager (or development management) responsibility class 162a, the responsibility classification engine 144 classifies the first data item 102a into the development management responsibility class 162a. The responsibility classification engine 144 may perform the responsibility classification operation for each data item 102. As such, the responsibility classification engine 144 categorically maps or classifies the data items 102 into their corresponding responsibility classes 162.

As discussed above, the responsibility classification engine 144 may implement supervised and/or unsupervised machine learning approaches. For example, in a training process, a training dataset comprising data items 102 labeled with job responsibility indications 124 may be fed to the responsibility classification engine 144. The responsibility classification engine 144 may learn the relationships and associations between the data items 102 and their responsibility indication labels 124, and classify them into different responsibility classes 162 based on their responsibility indication labels 124.

In a testing process, the responsibility classification engine 144 may be given a set of unlabeled data items 102, and asked to classify them based on the learned classification process of the training dataset.

In a refining process, the classification of the data items 102 during the testing process is verified by the responsibility classification engine 144 and/or an operator. For example, the responsibility classification engine 144 (and/or an operator) may verify the classification of the data items 102 by comparing the results from the testing process with the results from the training process. If the responsibility classification engine 144 (and/or an operator) determines that above a threshold percentage (e.g., above 90%) of the data items 102 are classified in their corresponding responsibility classes 162, the classification of the data items 102 is verified. Otherwise, the responsibility classification engine 144 is refined, for example, by adjusting weight and bias values of neural network layers of the responsibility classification engine 144.

Sensitivity Classification Engine and its Operations

Sensitivity classification engine 146 may be implemented by the processor 142 executing software instructions 154, and is generally configured to classify the data items 102 based on sensitivity features 164 extracted from the data items 102. The sensitivity classification engine 146 may classify or cluster the data items 102 into any of sensitivity classes 168a, 168b, . . . , 168n, etc.

In one embodiment, the sensitivity classification engine 146 may be implemented using machine learning classification algorithms, such as, for example, SVM, Naive Bayes, Logistic Regression, k-Nearest Neighbors, Decision Trees, etc. In other embodiment, sensitivity classification engine 146 may utilize a neural network comprising neural network layers, whose weight and bias values are optimized during training, testing, and refining processes, similar to that described above with respect to the responsibility classification engine 144. As such, the sensitivity classification engine 146 may implement supervised and/or unsupervised machine learning approaches.

The sensitivity classification engine 146 may perform one or more operations described below for each data item 102 to determine a corresponding sensitivity class 168 to which each data item 102 belongs. The sensitivity classification engine 146 may use an NLP algorithm to extract the features from a data item 102. The extracted features comprise sensitivity features 164, contextual features, among others. In this operation, the sensitivity classification engine 146 may use any type of text analysis, such as word segmentation, sentence segmentation, word tokenization, sentence tokenization, and/or the like. The sensitivity features 164 extracted from the data item 102 indicate a sensitivity level associated with the data item 102.

To extract the sensitivity features 164 from the data item 102, the sensitivity classification engine 146 may be trained to search for one or more keyword 166 from a second set of particular keywords 166 in the data item 102, where the second set of particular keywords 166 may indicate a sensitivity level associated with the data item 102. In one example, the second set of particular keywords 166 may comprise particular data security terminologies, such as terminologies related to encryption, decryption, security vulnerability, and the like. In another example, the second set of particular keywords 166 may comprise network security terminologies, such as terminologies related De-Militarized Zone (DMZ), firewall configurations, and the like. In another example, the second set of particular keywords 166 may indicate confidential information, such as an encryption key, a decryption key, a server address, a database address, personal information, login credentials, a piece of code, an algorithm structure, and the like.

The sensitivity classification engine 146 may detect the sensitivity feature 164 from the data item 102 from contextual data extracted from the data item 102. For example, the contextual data extracted from the data item 102 may comprise one or more indications indicating that the data item 102 comprises a discussion or information about a confidential topic, such as data security, network security, and the like. As such, the sensitivity classification engine 146 determines the sensitivity features 164 associated with the data item 102. Once the sensitivity classification engine 146 extracts the sensitivity features 164 from the data item 102, the sensitivity classification engine 146 determines a corresponding sensitivity class 168 to which the data item 102 belongs.

In one embodiment, the sensitivity classification engine 146 may be trained to divide or generate the sensitivity classes 168 in terms of the sensitivity levels 126. As such, the sensitivity classes 168 may represent or be associated with the sensitivity levels 126. For example, a first sensitivity class 168a may represent a low-security level 126a (e.g., 1 out of 10 security level 126a), a second sensitivity class 168b may represent a medium-low security level 126b (e.g., 4 out of 10 security level 126b), and so on. For example, if the sensitivity classification engine 146 determines that a first data item 102a is associated with a first sensitivity feature 164 that indicates the first data item 102a belongs to the 9 out of 10 sensitivity class 168a, the sensitivity classification engine 146 classifies the first data item 102a to the 9 out of 10 sensitivity class 168a. The sensitivity classification engine 146 may perform the sensitivity classification operation for each data item 102. As such, the sensitivity classification engine 146 categorically maps or classifies the data items 102 to their corresponding sensitivity classes 168.

Similar to that described above with respect to the responsibility classification engine 144, the sensitivity classification engine 146 may implement supervised and/or unsupervised machine learning approaches. For example, the sensitivity classification engine 146 may be trained with a training dataset comprising data items 102 labeled with sensitivity level indications 126, tested with unlabeled data items 102, and refined by adjusting weight and bias values of neural network layers of the sensitivity classification engine 146.

Tunneling Data Items to Corresponding Authorized Users

To tunnel a data item 102 to a user 104, the processor 142 first determines whether the user 104 is authorized to access the data item 102. The processor may perform one or more operations described below for each data item. Once the responsibility class 162 and the sensitivity class 168 of the data item 102 is determined (as described above), the processor 142 determines the responsibility level 124 and the security level 126 associated with a user 104 that the data item 102 is directed to.

If the processor 142 determines that the user 104 is associated with a responsibility level 124 and a security level 126 that, respectively, belongs to the same responsibility class 162 and the sensitivity class 168 that the data item 102 belongs, the processor 142 determines that the user 102 is authorized to access the data item 102. If the processor 142 determines that the user 104 is authorized to view the data item 102, the server 140 communicates the data item 102 to the user 104 (at a computing device 130 that the user 104 is associated with or logged into).

In the illustrated example of FIG. 1, the processor 142 determines that the first data item 102a is relevant to the first user 104a, i.e., the first data item 102a and the first user 102a are associated with the same responsibility class 162. The processor 142 also determines that the first user 104a is authorized to access the first data item 102a, i.e., the first data item 102a and the first user 102a are associated with the same sensitivity class 168. As such, the server 140 communicates the first data item 102a to the first computing device 130a (to which the first user 104a has access or is logged into). Similarly, in the illustrated example of FIG. 1, the processor 142 determines that the second data item 104b and the second user 104b are associated with or belong to the same responsibility class 162 and sensitivity class 168. As such, the server 140 communicates the second data item 102b to the second computing device 130b (to which the second user 104b has access or is logged into). A data item 102 tunneled or communicated to a user 104 may be displayed on a dashboard 132, similar to that described above.

In one embodiment, if the processor 142 determines that the user 104 is not authorized to view the data item 102, the processor 142 may terminate a communication path of the data item 102 to the user 104.

In another embodiment, if the processor 142 determines that the user 104 is not authorized to view the data item 102, the processor 142 may customize the data item 102, such that one or more portions in the data item 102 that the user 104 is not authorized to access are masked, obfuscated, or redacted. In this operation, the processor 142 may parse the data item 102 to identify one or more portions that the user 104 is not authorized to access. For example, the processor 142 may determine that the user 104 is not authorized to access the one or more portions in the data item 102 by determining a sensitivity level associated with each portion of the data item 102 and comparing the sensitivity level associated with each portion with the security level 126 associated with the user 104. For example, assume that the first data item 102a is on a communication path to the first user 104a who has a security level 126a of 6 out of 10. Also, assume that the first data item 102a and the first user 104a belong to the same responsibility class 162. Also, assume that the data item 102a includes a piece of code that the sensitivity classification engine 146 has determined belongs to a 9 out of 10 sensitivity class 168. In this example, the processor 142 determines that the user 104a is not authorized to access or view the piece of code in the data item 102 by comparing the sensitivity class 168 associated with the piece of code and the security level 126a of the first user 104a. As such, the processor 142 may obfuscate the piece of code such that is it not visible. Therefore, the processor 142 may modify the first data item 102a. The server 140 may then communicate the modified first data item 102a to the first user 104a.

Example Method for Classifying Data Items to Communicate to Authorized Users

Figure 2:
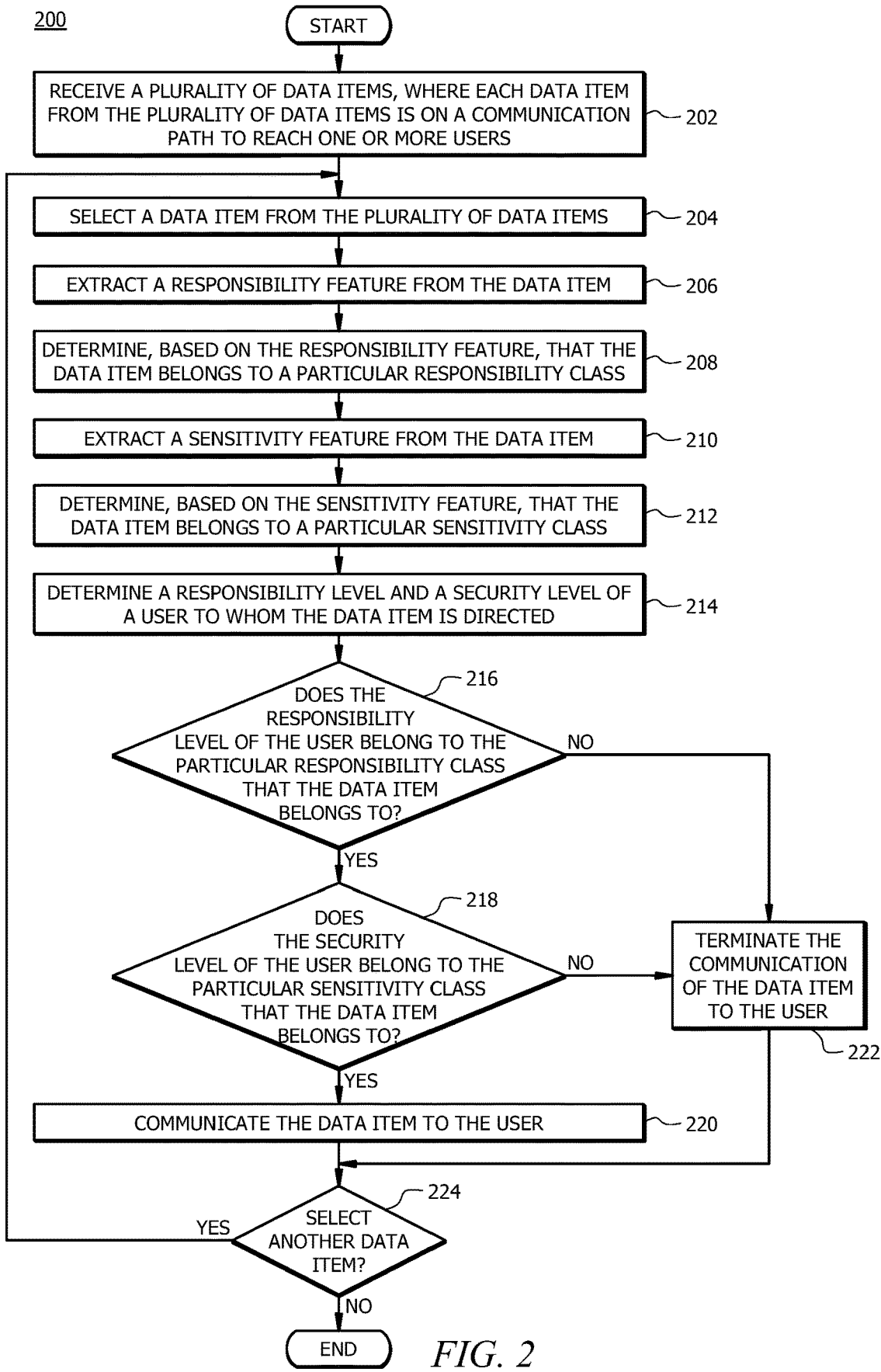
FIG. 2 illustrates an example flowchart of a method for classifying a plurality of data items to communicate to authorized users.

FIG. 2 illustrates an example flowchart of a method 200 for classifying data items 102 to communicate to authorized users 104. Modifications, additions, or omissions may be made to method 200. Method 200 may include more, fewer, or other steps. For example, steps may be performed in parallel or any suitable order. While at times discussed as the system 100, server 140, processor 142, responsibility classification engine 144, sensitivity classification engine 146, or components of any of thereof performing steps, any suitable system or components of the system may perform one or more steps of the method 200. For example, on or more steps of method 200 may be implemented, at least in part, in the form of software instructions 154 of FIG. 1, stored on non-transitory, tangible, machine-readable media (e.g., memory 152 of FIG. 1) that when run by one or more processors (e.g., processor 142 of FIG. 1) may cause the one or more processors to perform steps 202-224.

Method 200 begins at step 202 where the server 140 receives a plurality of data items 102, where each data item 102 from the plurality of data items 102 is on a communication path to reach one or more users 104. The plurality of data items 102 may comprise email messages, application notification messages, API requests, data stored in databases, data stored in servers, and/or any data that is communicated within an organization 106. In one example, the server 140 may receive the plurality of data items 102 from the data channel abstraction layer 134 that senders and sources of the plurality of data items 102 are subscribed to, similar to that described above in FIG. 1. In another example, the server 140 (or the data channel abstraction layer 134) may extract the plurality of data items 102 from their corresponding senders and sources. In another example, the server 140 (or the data channel abstraction layer 134) may act as an intercepting module, and intercept the plurality of data items 102 on their communication paths to their corresponding destinations.

At step 204, the processor 142 selects a data item 102 from the plurality of data items 102. The processor 142 iteratively selects a data item 102 until there is no data item 102 is left for processing.

At step 206, the responsibility classification engine 144 extracts responsibility features 158 from the data item 102. The responsibility feature 158 indicates a job responsibility associated with the data item 102. For example, the responsibility classification engine 144 may use an NLP algorithm to extract the responsibility feature 158 from the data item 102. To extract the responsibility feature 158 from the data item 102, the responsibility classification engine 144 may be trained to search for one or more keywords 160 from the first set of particular keywords 160 in the data item 102, where the first set of particular keywords 160 may indicate a job responsibility associated with the data item 102, similar to that described above in FIG. 1.

At step 208, the responsibility classification engine 144 determines, based on the responsibility feature 158, that the data item 102 belongs to a particular responsibility class 162. In other words, the responsibility classification engine 144 performs a responsibility classification on the data item 102. For example, if the responsibility classification engine 144 determines that the data item 102 is associated with a first responsibility feature 158 that indicates the data item 102 belongs to a development manager (or development management) responsibility class 162a, the responsibility classification engine 144 classifies the data item 102 into the development management responsibility class 162a.

At step 210, the sensitivity classification engine 146 extracts a sensitivity feature 164 from the data item 102. The sensitivity feature 164 indicates a sensitivity level associated with the data item 102. For example, the sensitivity classification engine 146 may use an NLP algorithm to extract the sensitivity feature 164 from the data item 102. To extract the sensitivity features 164 from the data item 102, the sensitivity classification engine 146 may be trained to search for one or more keywords 166 from the second set of particular keywords 166 in the data item 102, where the second set of particular keywords 166 may indicate a sensitivity level associated with the data item 102, similar to that described above in FIG. 1.

At step 212, the sensitivity classification engine 146 determines, based on the sensitivity feature 164, that the data item 102 belongs to a particular sensitivity class 168. In other words, the sensitivity classification engine 146 performs a sensitivity classification on the data item 102. For example, if the sensitivity classification engine 146 determines that the data item 102 is associated with a sensitivity feature 164 that indicates the data item 102 belongs to the 9 out of 10 sensitivity class 168a, the sensitivity classification engine 146 classifies the data item 102 to the 9 out of 10 sensitivity class 168a.

At step 214, the processor 142 determines a responsibility level 124 and a security level 126 associated with a user 104 to whom the data item 102 is directed. For example, the processor 142 may fetch the responsibility level 124 and the security level 126 associated with the user 104 from their user profile 122.

At step 216, the processor 146 determines whether the responsibility level 124 associated with the user 104 belongs to the particular responsibility class 162 to which the data item 102 belongs (as determined in step 208). If it is determined that the responsibility level 124 associated with the user 104 belongs to the particular responsibility class 162 to which the data item 102 belongs, method 200 proceeds to step 218. Otherwise, method 200 proceeds to step 222.

At step 218, the processor 146 determines whether the security level 126 associated with the user 104 belongs to the particular sensitivity class 168 to which the data item 102 belongs (as determined in step 212). If it is determined that the security level 126 associated with the user 104 belongs to the sensitivity class 168 to which the data item 102 belongs, method 200 proceeds to step 220. Otherwise, method 200 proceeds to step 222.

At step 220, the server 140 (via the processor 142) communicates the data item 102 to the user 104. In other words, the processor 142 determines that the user 104 is authorized to access the data item 102 and the data item 104 is relevant to the user 104. As such, the processor 142 causes the server 140 to communicate the data item 102 to the user 104. For example, the data item 102 may be displayed on the dashboard 132 on a computing device 130 that the user 104 is associated with or logged into.

At step 222, the server 140 (via the processor 142) terminates the communication of the data item 102 to the user 104. In other words, the processor 142 determines that the user 104 is not authorized to access the data item 102 and/or the data item 102 is not relevant to the user 104. As such, the processor 142 causes the server 140 to terminate the communication of the data item 102 to the user 104. In one embodiment, the server 140 (via the processor 142) may customize or modify the data item 102, such that one or more portions in the data item 102 that the user 104 is not authorized to access are masked, obfuscated, or redacted, similar to that described above in FIG. 1.

At step 224, the processor 142 determines whether to select another data item 102. The processor 142 determines to select another data item 102 if at least one data item 102 is left for processing. If processor 142 determines to select another data item 102, method 200 returns to step 204. Otherwise, method 200 terminates.

Although the method 200 of FIG. 2 illustrates that the responsibility classification process on the data item 102 (i.e., steps 206-208) is performed before the sensitivity classification process (i.e., steps 210-212), one of ordinary skill in the art would recognize other embodiments of the method 200. For example, the sensitivity classification process (i.e., steps 210-212) may be performed before the responsibility classification process (i.e., steps 206-208) by the system 100 of FIG. 1. In another example, the responsibility classification process (i.e., steps 206-208) and the sensitivity classification process (i.e., steps 210-212) may be performed in parallel by the system 100 of FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements 118 or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for classifying a plurality of data items to communicate to authorized users, comprising:
   a memory operable to store a plurality of user profiles, wherein:
     each user profile from the plurality of user profiles comprises at least one of a responsibility level and a security level associated with a user;
     the responsibility level indicates a job responsibility associated with the user; and
     the security level indicates corresponding data items that the user is authorized to access; and
   a processor operably coupled with the memory, and configured to:
     receive the plurality of data items, wherein each data item from the plurality of data items is on a communication path to reach a user;
     for each data item from the plurality of data items:
       extract features from the data item, wherein:
         the extracted features comprise a responsibility feature and a sensitivity feature associated with the data item;
         the responsibility feature indicates a job responsibility associated with the data item; and
         the sensitivity feature indicates a sensitivity level associated with the data item;
       determine, based at least in part upon the responsibility feature, that the data item belongs to a particular responsibility class;
       determine, based at least in part upon the sensitivity feature, that the data item belongs to a particular sensitivity class;
       determine a responsibility level and a security level associated with a user to whom the data item is directed;
       determine whether the responsibility level associated with the user belongs to the particular responsibility class;
       determine whether the security level associated with the user belongs to the particular sensitivity class;
       in response to determining that the responsibility level associated with the user belongs to the particular responsibility class and the security level associated with the user belongs to the particular sensitivity class:
         communicate the data item to a computing device associated with the user; and
         select a particular configuration of a dashboard on the computing device to display the data item, wherein selecting the particular configuration of the dashboard comprises activating, on the dashboard, interfaces that select the particular responsibility class and the particular sensitivity class.

2. The system of claim 1, wherein the plurality of data items comprises at least one of an email message, an application notification message, and an Application Programming Interface (API) request.

3. The system of claim 1, wherein receiving the plurality of data items comprises intercepting each data item from the plurality of data items from being sent to a corresponding user to which the data item is directed.

4. The system of claim 1, wherein in response to determining that at least one of the responsibility level associated with the user does not belong to the particular responsibility class and the security level associated with the user does not belong to the particular sensitivity class, the processor is further configured to terminate a communication path of the data item to the user.

5. The system of claim 1, wherein in response to determining that at least one of the responsibility level associated with the user does not belong to the particular responsibility class and the security level associated with the user does not belong to the particular sensitivity class, the processor is further configured to:
   determine one or more portions in the data item that the user is not authorized to access;
   modify the data item such that the one or more portions are not visible, wherein modifying the data item comprises masking the one or more portions; and
   communicate the modified data item to the user.

6. The system of claim 1, wherein determining that the data item belongs to the particular responsibility class comprises determining that the data item comprises one or more particular sets of keywords that indicate that the data item belongs to the particular responsibility class.

7. The system of claim 1, wherein determining that the data item belongs to the particular security level class comprises determining that the data item comprises one or more second sets of keywords that indicate that the data item belongs to the particular sensitivity class.

8. A method for classifying a plurality of data items to communicate to authorized users, comprising:
   receiving a plurality of data items, wherein each data item from the plurality of data items is on a communication path to reach a user;
   for each data item from the plurality of data items:
     extracting features from the data item, wherein:
       the extracted features comprise a responsibility feature and a sensitivity feature associated with the data item;
       the responsibility feature indicates a job responsibility associated with the data item; and
       the sensitivity feature indicates a sensitivity level associated with the data item;
     determining, based at least in part upon the responsibility feature, that the data item belongs to a particular responsibility class;
     determining, based at least in part upon the sensitivity feature, that the data item belongs to a particular sensitivity class;

determining a responsibility level and a security level associated with a user to whom the data item is directed, wherein:
  the responsibility level indicates a job responsibility associated with the user; and
  the security level indicates corresponding data items that the user is authorized to access;
determining whether the responsibility level associated with the user belongs to the particular responsibility class;
determining whether the security level associated with the user belongs to the particular sensitivity class; and
in response to determining that the responsibility level associated with the user belongs to the particular responsibility class and the security level associated with the user belongs to the particular sensitivity class:
  communicating the data item to a computing device associated with the user; and
  selecting a particular configuration of a dashboard on the computing device to display the data item, wherein selecting the particular configuration of the dashboard comprises activating, on the dashboard, interfaces that select the particular responsibility class and the particular sensitivity class.

9. The method of claim 8, wherein the plurality of data items comprises at least one of an email message, an application notification message, and an Application Programming Interface (API) request.

10. The method of claim 8, wherein receiving the plurality of data items comprises intercepting each data item from the plurality of data items from being sent to a corresponding user to which the data item is directed.

11. The method of claim 8, wherein further comprising, in response to determining that at least one of the responsibility level associated with the user does not belong to the particular responsibility class and the security level associated with the user does not belong to the particular sensitivity class, terminating a communication path of the data item to the user.

12. The method of claim 8, wherein further comprising:
  in response to determining that at least one of the responsibility level associated with the user does not belong to the particular responsibility class and the security level associated with the user does not belong to the particular sensitivity class:
    determining one or more portions in the data item that the user is not authorized to access;
    modifying the data item such that the one or more portions are not visible, wherein modifying the data item comprises masking the one or more portions; and
    communicating the modified data item to the user.

13. The method of claim 8, wherein determining that the data item belongs to the particular responsibility class comprises determining that the data item comprises one or more particular sets of keywords that indicate that the data item belongs to the particular responsibility class.

14. The method of claim 8, wherein determining that the data item belongs to the particular security level class comprises determining that the data item comprises one or more second sets of keywords that indicate that the data item belongs to the particular sensitivity class.

15. A non-transitory computer-readable medium that stores instructions, wherein when the instructions are executed by a processor, cause the processor to:

receive a plurality of data items, wherein each data item from the plurality of data items is on a communication path to reach a user;
for each data item from the plurality of data items:
  extract features from the data item, wherein:
    the extracted features comprise a responsibility feature and a sensitivity feature associated with the data item;
    the responsibility feature indicates a job responsibility associated with the data item; and
    the sensitivity feature indicates a sensitivity level associated with the data item;
  determine, based at least in part upon the responsibility feature, that the data item belongs to a particular responsibility class;
  determine, based at least in part upon the sensitivity feature, that the data item belongs to a particular sensitivity class;
  determine a responsibility level and a security level associated with a user to whom the data item is directed;
  determine whether the responsibility level associated with the user belongs to the particular responsibility class;
  determine whether the security level associated with the user belongs to the particular sensitivity class; and
  in response to determining that the responsibility level associated with the user belongs to the particular responsibility class and the security level associated with the user belongs to the particular sensitivity class:
    communicate the data item to the user; and
    select a particular configuration of a dashboard on the computing device to display the data item, wherein selecting the particular configuration of the dashboard comprises activating, on the dashboard, interfaces that select the particular responsibility class and the particular sensitivity class.

16. The non-transitory computer-readable medium of claim 15, wherein the plurality of data items comprises at least one of an email message, an application notification message, and an Application Programming Interface (API) request.

17. The non-transitory computer-readable medium of claim 15, wherein receiving the plurality of data items comprises intercepting each data item from the plurality of data items from being sent to a corresponding user to which the data item is directed.

18. The non-transitory computer-readable medium of claim 15, wherein in response to determining that at least one of the responsibility level associated with the user does not belong to the particular responsibility class and the security level associated with the user does not belong to the particular sensitivity class, the processor is further configured to terminate a communication path of the data item to the user.

19. The non-transitory computer-readable medium of claim 15, wherein in response to determining that at least one of the responsibility level associated with the user does not belong to the particular responsibility class and the security level associated with the user does not belong to the particular sensitivity class, the processor is further configured to:
  determine one or more portions in the data item that the user is not authorized to access;

modify the data item such that the one or more portions are not visible, wherein modifying the data item comprises masking the one or more portions; and
communicate the modified data item to the user.

20. The non-transitory computer-readable medium of claim 15, wherein determining that the data item belongs to the particular responsibility class comprises determining that the data item comprises one or more particular sets of keywords that indicate that the data item belongs to the particular responsibility class.

* * * * *